Figure 1:
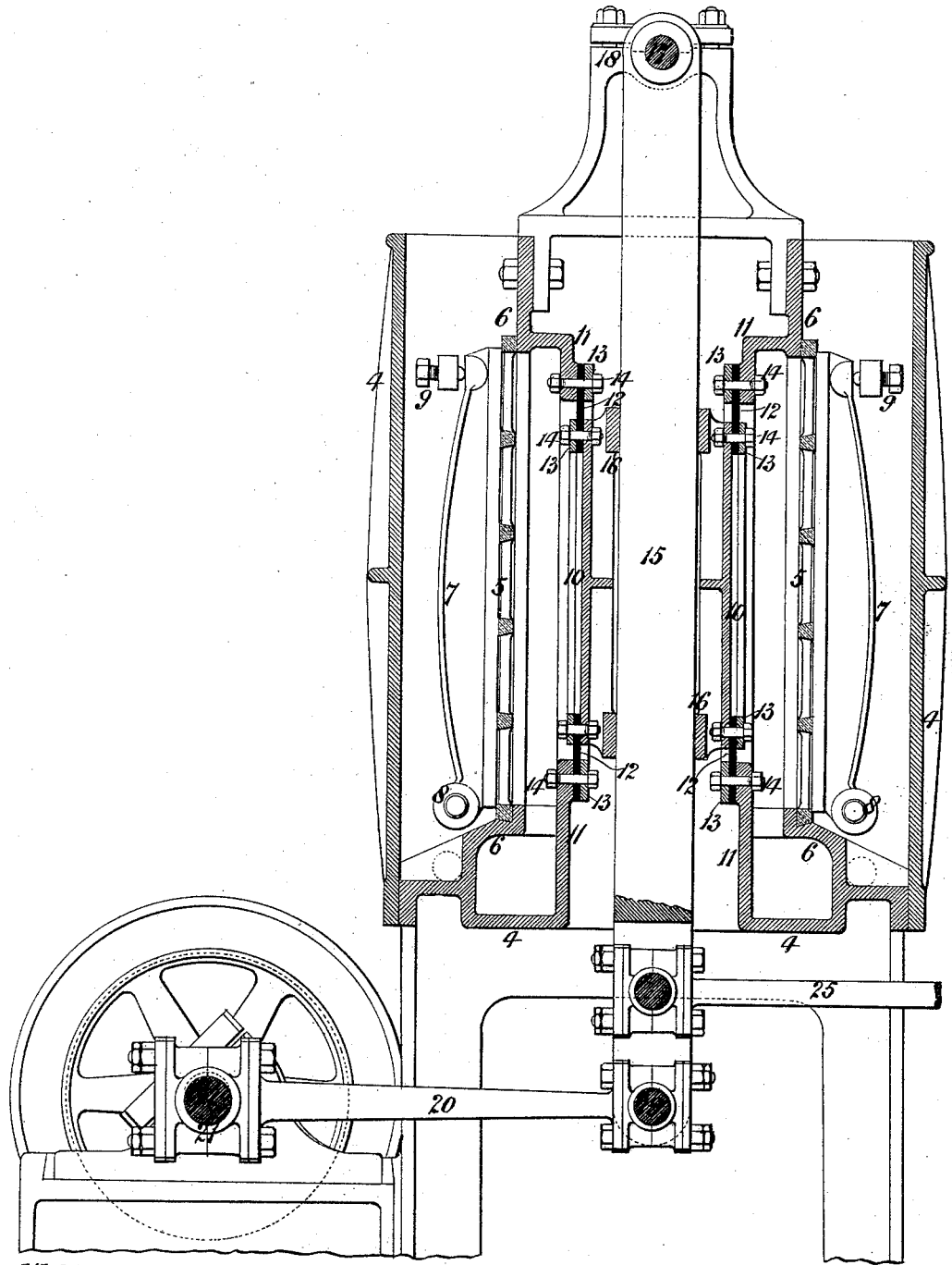

(No Model.) 3 Sheets—Sheet 1.

T. GOODALL & T. WEBSTER.
PULP STRAINER.

No. 435,091. Patented Aug. 26, 1890.

Witnesses
E. J. Griswold
S. C. Connor

Inventors
Thomas Goodall and Thomas Webster
By their Attorneys
Howson and Howson

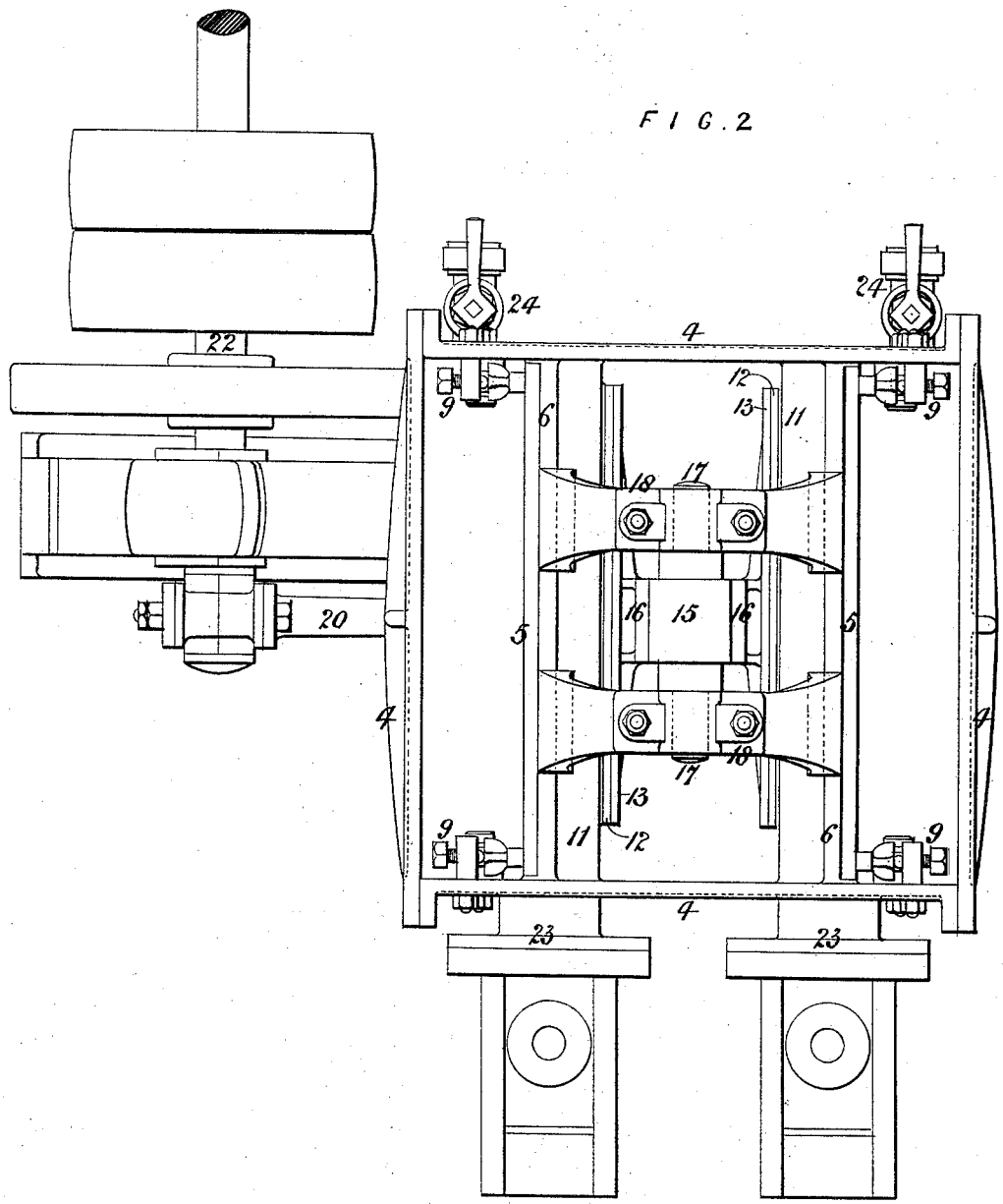

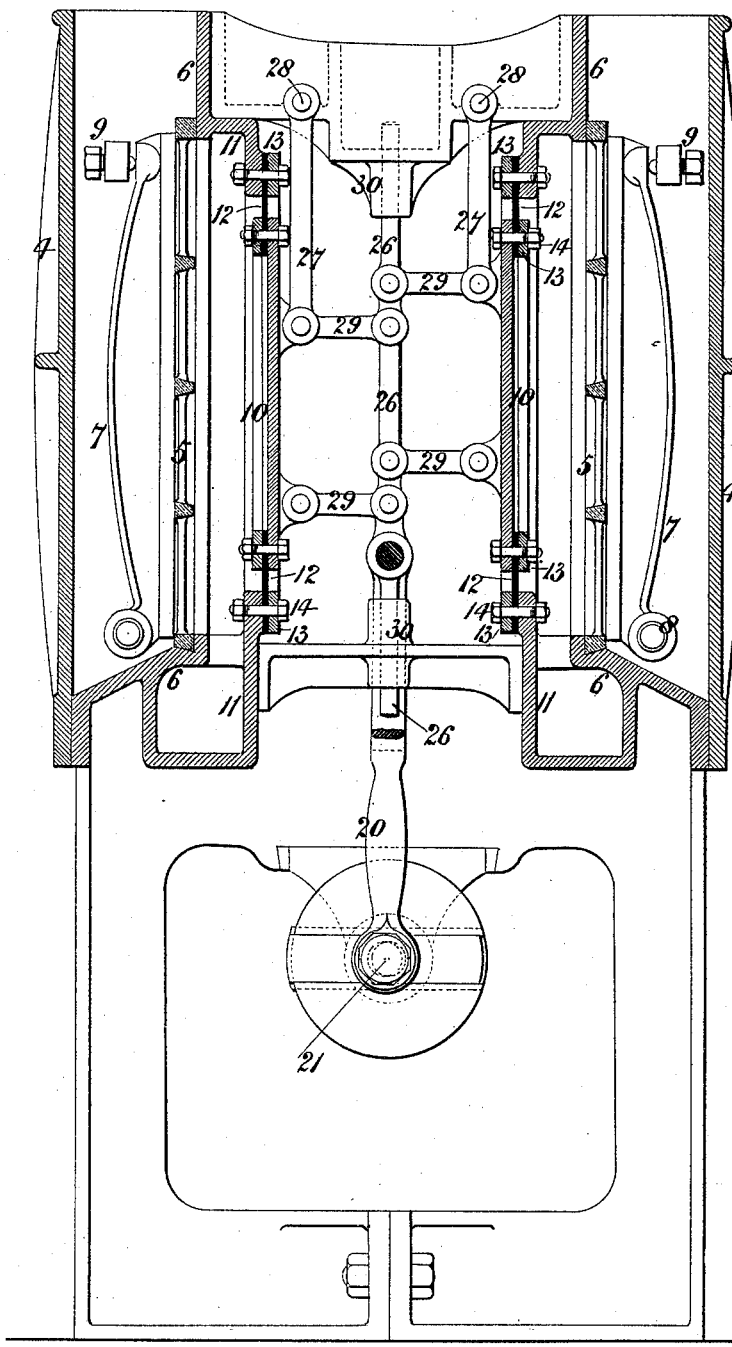

UNITED STATES PATENT OFFICE.

THOMAS GOODALL AND THOMAS WEBSTER, OF SUNDERLAND, COUNTY OF DURHAM, ENGLAND, ASSIGNORS TO JAMES BERTRAM & SON, OF EDINBURGH, SCOTLAND.

PULP-STRAINER.

SPECIFICATION forming part of Letters Patent No. 435,091, dated August 26, 1890.

Application filed September 3, 1889. Serial No. 322,903. (No model.) Patented in England April 15, 1887, No. 5,528, and June 26, 1888, No. 9,339.

*To all whom it may concern:*

Be it known that we, THOMAS GOODALL and THOMAS WEBSTER, subjects of the Queen of Great Britain and Ireland, and residents of Sunderland, in the county of Durham, England, have invented certain Improvements in Pulp-Strainers, (for which we have obtained British Patents No. 5,528, dated April 15, 1887, and No. 9,329, dated June 26, 1888,) of which the following is a specification.

This invention has for its object to improve the construction and action of apparatus for straining pulp for the manufacture of paper, half-stuff, mill-board, and other analogous materials; and in order that our said invention and the manner of performing the same may be properly understood reference is made to the accompanying drawings, showing our improved apparatus, in which—

Figure 1 on Sheet 1 is a vertical section of the apparatus, Fig. 2 on Sheet 2 being a plan of the same. Fig. 3 on Sheet 3 is a vertical section showing parts of the apparatus as slightly modified.

In carrying out our invention the pulp to be strained is fed in any suitable manner into both sides of a two-compartment vat 4, made of wood or iron or other suitable material, and by preference of a rectangular form in plan. Two strainer-plates 5, of brass, copper, zinc, or other suitable material, are placed vertically across the vat 4 against frames 6, formed on the vat-casting, and with the strainer-plates 5 forming vertical partitions or diaphragms in each compartment of the vat 4. The strainer-plates 5 are held in position by bars 7, hinged at 8 and secured by screws 9. The pulp is fed into the vat 4 on the outer sides of the strainer-plates 5, and it is drawn through them by the action of a pair of pulsating plates 10, constructed and arranged to close openings in frames 11 at the inner sides of the two compartments of the vat, being fixed to those frames by means of diaphragms 12, of elastic or flexible material, secured to the edges of the plates 10 and to the edges of the frames 11 by rings or frames 13 and bolts 14. Each outer chamber 33 formed in the vat by the diaphragm or strainer-plate is open at the top to receive the pulp to be strained; but each inner chamber 31 is closed, as described, except at the bottom, where it opens into a box 32, which is provided at the side with an outlet 23, Fig. 2, having a movable sluice.

The required pulsating motion is imparted to the plates 10 by a lever 15, which is suspended between the plates 10 in such a manner as to engage with and carry a frame 16 fixed to the plates and impart the required reciprocation or pulsation to them. The lever 15 is arranged as a pendulum-lever, centered and free to oscillate on a pin 17, supported by brackets 18 bolted to the vat, and its bottom forked end is jointed by a pin 19 to a connecting-rod 20, having its other end jointed to a crank-pin 21 on a shaft 22, to which rotatory motion is imparted by a belt and pulley or otherwise in any suitable manner.

The strained pulp passes from the vat 4 through outlets 23, made in the sides of the vat, while the matters left at the outer sides of the strainer-plates are drawn off periodically through outlets fitted with stop-cocks 24 at the bottom of the vat, whence they may pass to an auxiliary strainer.

In lieu of the lever 15 being suspended at a point 17 above the vat, it may be centered or supported at any other suitable point, and it may be connected at any convenient point to the rod 20 or other equivalent device for operating it, and any required extent of vibratory movement may be given to the pulsating plates 10 by arranging the point of support of the lever 15 and the point of its connection with the rod 20 relatively to the plates and to the throw of the crank-pin, as may be required.

Where the quantity of material to be dealt with is sufficient, we prefer to combine together two or more vats, each with its two compartments and two strainer-plates, the vats or vat-sections being bolted together, with partition-plates inserted to separate the compartments which are adjacent when the sections are brought together. A lever 15 is applied between each pair of pulsating plates 10, and the two or more levers 15 may be connected by a rod 25, Fig. 1, so that their motions may all be derived from the same rotating crank-pin 21.

In the modification shown in Fig. 3 the two opposite pulsating plates 10 are operated by a vertically-reciprocating rod 26, each plate 10 being suspended by a rod 27 from a fixed pin 28 and being connected to the rod 26 by links 29. The rod 26 is guided in top and bottom guides 30, and has the desired reciprocating movement imparted to it by means of a forked rod 20 connecting it to the rotating crank-pin 21.

We claim as our invention—

In combination, for straining pulp, a vat made with two compartments with a vertical strainer-plate in each compartment, dividing it into an outer chamber to receive the unstrained pulp and an inner closed chamber having an outlet below with vertical pulsating plates closing these inner chambers, and means for pulsating the plates, substantially as set forth.

In testimony whereof we have signed our names to this specification in the presence of two subscribing witnesses.

THOMAS GOODALL.
THOMAS WEBSTER.

Witnesses:
JOHN HERON,
*Book-keeper, Tel-el-Kebir Road, Sunderland.*
JAMES HERON,
*Clerk, Tel-el-Kebir Road, Sunderland.*